US007873020B2

(12) United States Patent
Hunt et al.

(10) Patent No.: US 7,873,020 B2
(45) Date of Patent: Jan. 18, 2011

(54) CAPWAP/LWAPP MULTICAST FLOOD CONTROL FOR ROAMING CLIENTS

(75) Inventors: David Hunt, Scotts Valley, CA (US); Jacob E. Woodhams, San Martin, CA (US); David M. Stiff, Los Altos, CA (US); Sujit Ghosh, Newark, CA (US); Joshua G. Broch, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 747 days.

(21) Appl. No.: 11/865,512

(22) Filed: Oct. 1, 2007

(65) Prior Publication Data

US 2009/0086689 A1   Apr. 2, 2009

(51) Int. Cl.
*H04Q 7/24* (2006.01)
*H04B 7/00* (2006.01)
*H04L 12/28* (2006.01)
*H04L 12/56* (2006.01)

(52) U.S. Cl. ........................ 370/338; 370/310; 370/351; 370/392

(58) Field of Classification Search ........................ None
See application file for complete search history.

(56) References Cited

U.S. PATENT DOCUMENTS

| 5,276,680 A | 1/1994 | Messenger | 370/311 |
| 5,621,732 A | 4/1997 | Osawa | 370/346 |

(Continued)

OTHER PUBLICATIONS

Cisco IOS Release 12.2(15)T, Cisco Mobile Networks—Tunnel Templates for Multicast, 2005 Cisco Systems.
Maarten Hoeben; "No Wires Needed"; May 10, 2000; IEEE P802.11.

(Continued)

*Primary Examiner*—Ayaz R Sheikh
*Assistant Examiner*—Blanche Wong
(74) *Attorney, Agent, or Firm*—Dov Rosenfeld; Inventek

(57) ABSTRACT

A method, an apparatus, a system, and logic encoded in one or more computer-readable tangible medium to carry out a method. The method includes maintaining the state of clients of an access point controlled by a controller in the controller of the access point, including multicast group information, and updating the access point with multicast group identification for the clients, such that the controller in combination with the access point can forward packets, and such that multicast group information for a roaming client of the access point is maintained.

20 Claims, 7 Drawing Sheets

U.S. PATENT DOCUMENTS

| | | |
|---|---|---|
| 5,673,031 A | 9/1997 | Meier .................... 340/2.4 |
| 5,737,328 A | 4/1998 | Norman et al. ............. 370/331 |
| 6,002,918 A | 12/1999 | Heiman et al. ............. 340/7.38 |
| 6,049,533 A | 4/2000 | Norman et al. ............. 370/328 |
| 6,067,297 A | 5/2000 | Beach .................... 370/389 |
| 6,195,705 B1 | 2/2001 | Leung .................... 709/245 |
| 6,370,412 B1 | 4/2002 | Armoundas et al. ......... 600/373 |
| 6,532,233 B1 | 3/2003 | Momona et al. ............ 370/390 |
| 6,754,197 B1 | 6/2004 | Davidson et al. ....... 370/395.53 |
| 7,042,865 B1 | 5/2006 | Meier et al. ............... 370/338 |
| 2002/0046271 A1 | 4/2002 | Huang .................... 709/223 |
| 2005/0025160 A1 | 2/2005 | Meier et al. ........... 370/395.53 |
| 2007/0064673 A1* | 3/2007 | Bhandaru et al. .......... 370/351 |
| 2007/0160017 A1* | 7/2007 | Meier et al. ................ 370/338 |

OTHER PUBLICATIONS

Mathilde Benveniste; "Tiered Contention"; Nov. 2000; IEEE P802.11.

Menzo Wentink; "Probabilistic DCF Versus Backoff DCF"; Nov. 2000; IEEE P802.11.

XP-002307525, "IEEE Standard for Local and Metropolitan area networks Port-Based Network Access Control", LAN/MAN Standards Committee of the IEEE Computer Society, pp. 13-21.

Bernard Aboboba, et al., XP-002307526, IEEE 802.1X For Wireless LANs', Mar. 2000, Slides 1-27.

* cited by examiner

CAPWAP/LWAPP MULTICAST FLOOD CONTROL FOR ROAMING CLIENTS

FIELD OF THE INVENTION

The present disclosure relates generally to wireless networks.

BACKGROUND

Multicasting, e.g., IP multicasting is widely used as a method to send transmissions to a select group of recipients that belong to what is called a "multicast group." Multicast allows a single stream of packets, e.g., media stream packets to be sent a plurality of recipients, e.g., client devices that are in the same multicast group. Wireless networks, however, pose new situations that multicast, as originally conceived, was not meant to address.

In an infrastructure wireless local area network (WLAN), client devices ("clients") are associated with an access point (AP) that is typically directly coupled to a wired network. Recently, access points whose access point functionality is controlled by a controller—so called lightweight access points—have become widely used. Clients that are members of the same multicast group might roam across many controllers, e.g., from one access point controlled by one controller to another access point controlled by another controller. To successfully multicast, in multicast strategy, multicast information in the form of one or more packets is flooded to every access point on every controller. If a single client, for example, roams across four access points, each having a different controller, each time sending the appropriate "join" request to move to the access point, then every access point of each such controller would need to broadcast multicast packets whether or not a client of the particular multicast group is associated.

Similarly, a controller can and does forward multicast traffic from the wired network where no clients that are members have joined. This could be routing protocol updates or multicast groups that the wired network is flooding toward the WLAN controller interface. Thus, there would clearly be an advantage in a wireless network to have processes that keep track of roaming clients that are meant to be receiving multicast traffic, and to avoid sending traffic to access points that have no recipients, e.g., client devices associated.

DESCRIPTION OF EXAMPLE EMBODIMENTS

Overview

Figure 1:
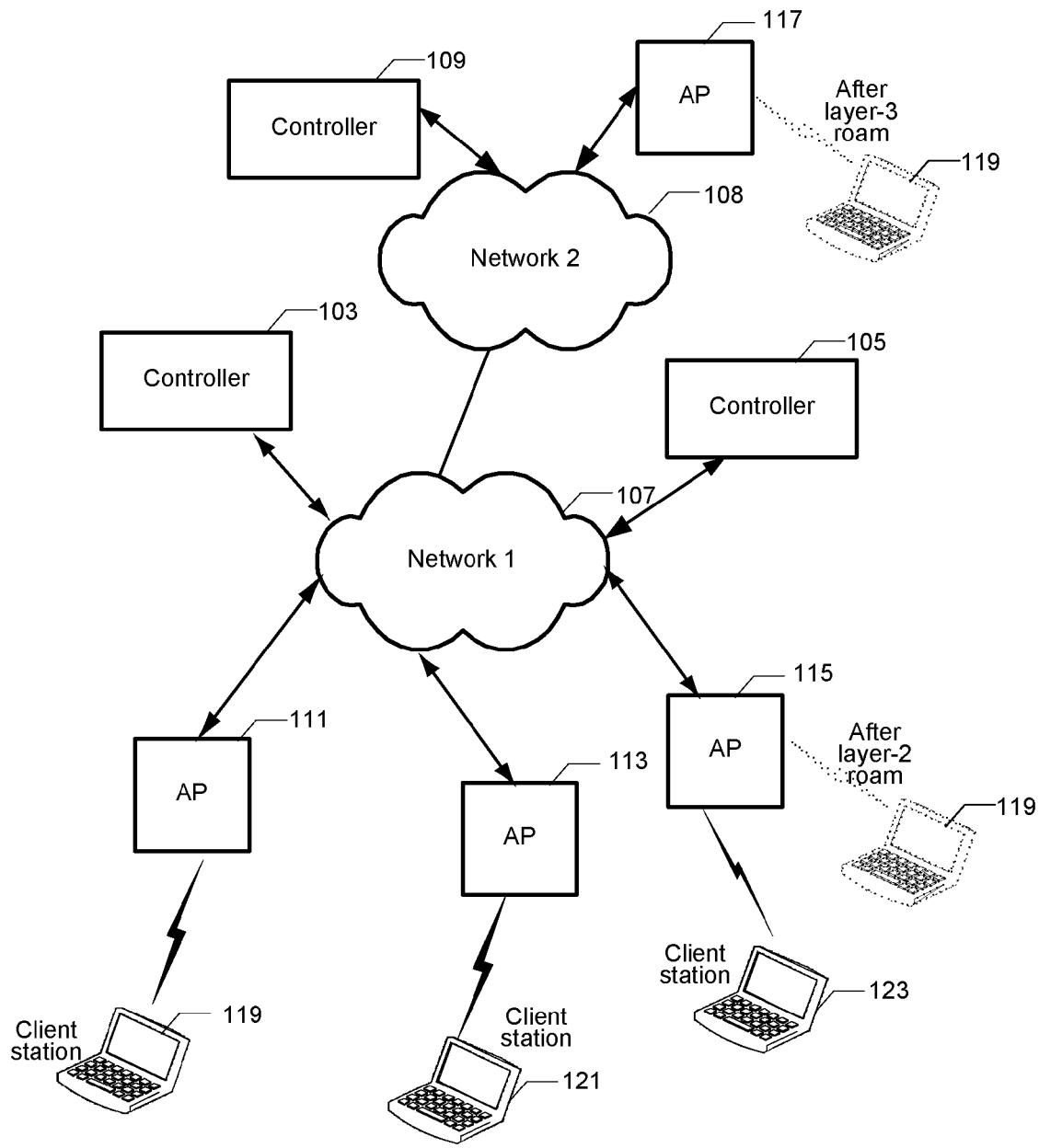
FIG. 1 shows an example network including an example wireless network in which an embodiment of the present invention operates.

Embodiments of the present invention include a method, an apparatus, and logic encoded in one or more computer-readable tangible mediums to carry out a method.

Particular embodiments include a method comprising maintaining the state of clients of an access point controlled by a controller in the controller of the access point, including multicast group information, and updating the access point with multicast group identification for the clients, such that the controller in combination with the access point can forward packets, and such that multicast group information for a roaming client of the access point is maintained.

Particular embodiments include a method at a first controller controlling and having one or more secure links to one or more respective access points of a wireless network. The method comprises receiving a plurality of data packets including at least one predetermined identifier operative to identify one or more multicast groups, the first controller controlling access point functionality of its respective access points. The method further comprises maintaining a controller-maintained client state data structure including an entry for any client of any access point controlled by the first controller, the entry for a client including multicast group information for the client, selecting the data packets of the received data packets that match information in the client state data structure, and forwarding the controller-selected data packets to one or more access points controlled by the first controller, such that a first access point controlled by the first controller and maintaining a multicast group data structure of one or more multicast groups that any client or clients associated with the first access point are members of, as a result of receiving the controller-selected packets forwarded by the first controller, is operative to look up its multicast group data structure, to select received packets according to whether or not information in the packets matches information in the multicast group data structure, and to wirelessly transmits the access-point-selected packets, wherein the controlling of the access point functionality of an access point by its controller uses commands conforming to a protocol and sent to the respective access point via the secure link to the access point.

In one embodiment, the method further comprises the first controller detecting that a first client of the first access point has roamed, in the case that the roam is to a second access point controlled by the first controller, instructing the second access point to change its multicast group data structure, in the case the roam is to a second access point controlled by a second controller, the first controller receiving a mobility message from a second controller regarding the first client and sending information on the first client to the second controller. The method further comprises ascertaining if a change to its client state data structure is needed, and if the change is needed, changing the contents of its client state data structure; and instructing the first access point to change its multicast group data structure.

Particular embodiments include a system comprising a first controller in a wireless network operative to control one or more wireless access points, with the controller including a memory subsystem operative to store a client state data structure including an entry for the client or clients of the access point or points controlled by the first controller, an entry for a client including multicast group information for the client; and a first wireless access point having a secure link with the first controller, and whose access point functionality is controlled by the first controller using commands conforming to a protocol and sent via the secure link, the first access point including a memory subsystem operative to store a multicast group data structure of one or more multicast groups that any client or clients associated with the first access point are members of, such that the first controller receiving data packets including at least one predetermined identifier is operative to identify one or more multicast groups, is operative to select the data packets of the received data packets that match information in the client state data structure for clients of the first access point and to forward the controller-selected data packets to the access point, and such that the first wireless access point as a result of receiving the controller-selected packets forwarded by the first controller, is operative to: look up its multicast group data structure, select received packets according to whether or not information in the packets matches information in the multicast group data structure, and wirelessly transmits the access-point-selected packets.

Particular embodiments include a controller comprising one or more network interfaces operative to couple a controller to a network and further operative to couple the controller to a first wireless access point of a wireless network, with the coupling between the controller and the first access point including a secure link over which commands are sendable that conform to a protocol and that are to control access point functionality of the first access point, the first access point including a memory subsystem operative to store a multicast group data structure of one or more multicast groups that any client or clients associated with the first access point are members of. The controller further comprises a memory subsystem operative to store a client state data structure including an entry for the client or clients of the access point or points controlled by the controller; an entry for a client including multicast group information for the client; and logic configured such that as a result of the controller receiving a plurality of data packets including at least one predetermined identifier operative to identify one or more multicast groups, the controller is operative to select the data packets of the received data packets that match information in the client state data structure for clients of the first access point and to forward the controller-selected data packets to the access point, such that the first wireless access point as a result of receiving the controller-selected packets forwarded by the controller, is operative to look up its multicast group data structure, to select received packets according to whether or not information in the packets matches information in the multicast group data structure, and to wirelessly transmit the access-point-selected packets.

Particular embodiments may provide all, some, or none of these aspects, features, or advantages. Particular embodiments may provide one or more other aspects, features, or advantages, one or more of which may be readily understood by a person skilled in the art from the figures, descriptions, and claims herein.

The Wireless Network

FIG. 1 shows an example network that includes an example wireless network that includes an embodiment of the present invention. The wireless network includes a set of access points (APs) 111, 113, and 115 that in one embodiment are so-called lightweight access points whose access point functionality is controlled by a respective wireless network controller (WLAN controller, controller). Two controllers 103 and 105 are shown. Each AP is coupled to a network 107, and each controller is also coupled to a network, which is either the same network 107 or a network to which the network 107 is connected. In this example, APs 111 and 113 are controlled by controller 103 in network 107, and AP 115 is controlled by controller 105 in the same network 107. Each AP forms a secure link to its respective controller and communicates with its controllers using a protocol so that the respective controller can control its respective AP's access point functionality. In one embodiment, the protocol is one known as CAPWAP (Control And Provisioning of Wireless Access Points) and as of April 2007, an IETF draft. See www.capwap.org. The April 2007 version (version 06) of CAPWAP is a file "draft-ietf-capwap-protocol-specification-06.txt" retrieved Apr. 18, 2007 at www.capwap.org/draft-ietf-capwap-protocol-specification-06.txt. CAPWAP is a later version of LWAPP (Light Weight Access Point Protocol) from Cisco Systems, Inc., San Jose, Calif. The invention, however, is not limited to any particular type of protocol.

Three client stations 119, 121 and 123 are shown in FIG. 1, associated to APs 111, 113, and 115, respectively.

FIG. 1 also shows a second network 108—a foreign network to network 107—that is coupled to the network 107, and that includes an AP 117 that is a lightweight AP whose AP functionality is controller by a controller 109.

Figure 2:
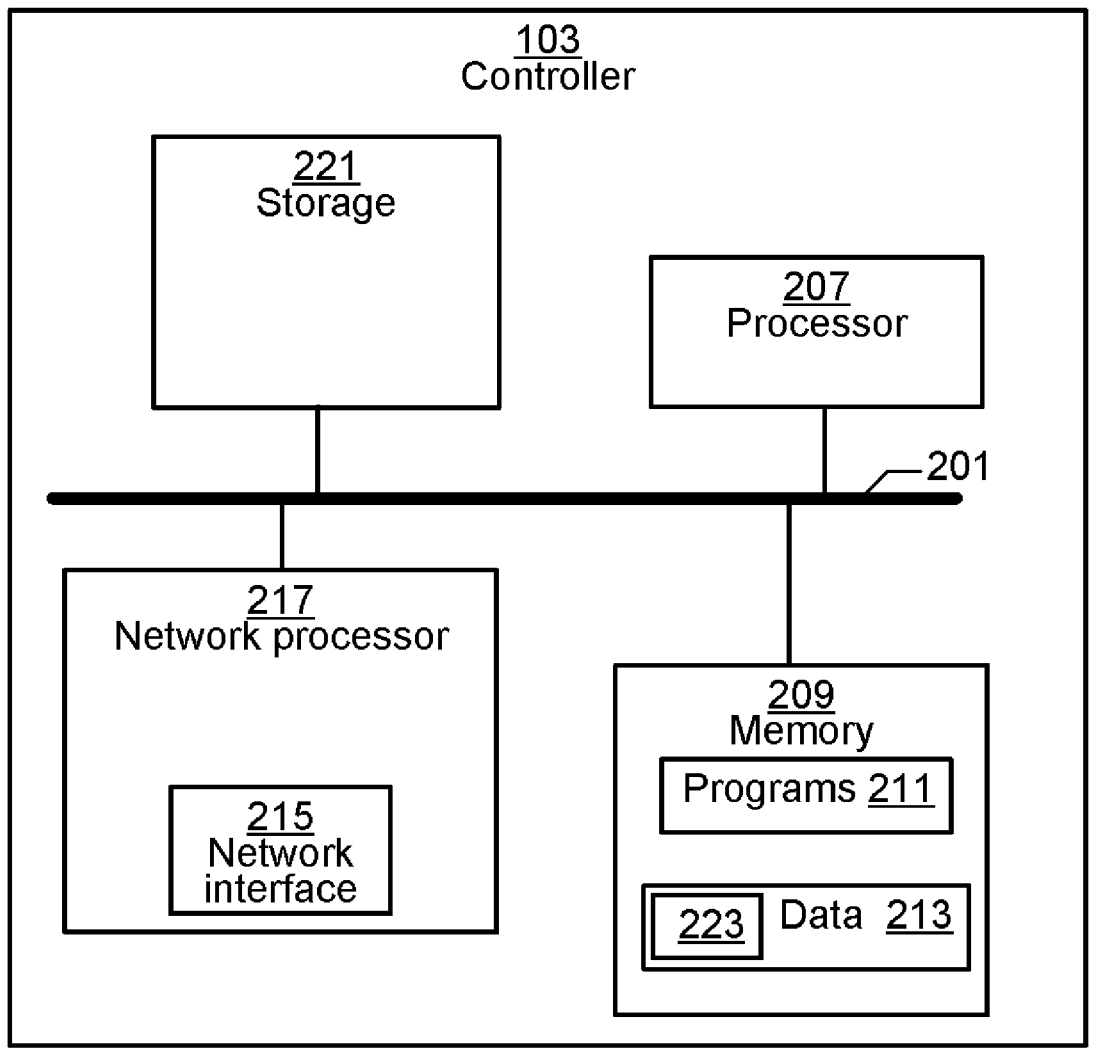
FIG. 2 shows a simplified block diagram of one embodiment of a controller that includes an embodiment of the present invention.

FIG. 2 shows a simplified block diagram of one embodiment of the controller 103. The controller includes a bus structure shown in simplified form as a single bus 201, a processor, e.g., general purpose processor 207, a storage subsystem 221, and a memory subsystem 209. In some embodiments, the controller 103 includes a network processor 217 for fast packet processing that includes a network interface 215 that serves as the network interface for the processes described herein. In some embodiments, the controller includes special purpose hardware, including memory for special purpose network instructions. The memory 209 is shown to include programs 211 including the programs needed to implement the processes of the controller 103 described herein. The memory subsystem 209 also includes data 213 that includes the data structures maintained in the controller as described herein and used in implementing one or more features of an embodiment of the present invention. Note that those in the art will understand that not all of the programs and not all of the data structures may be in memory at all times, an that some of this may be in the data storage subsystem 221. Furthermore, those in the art will understand that alternate architecture may not include a network processor.

Figure 3:
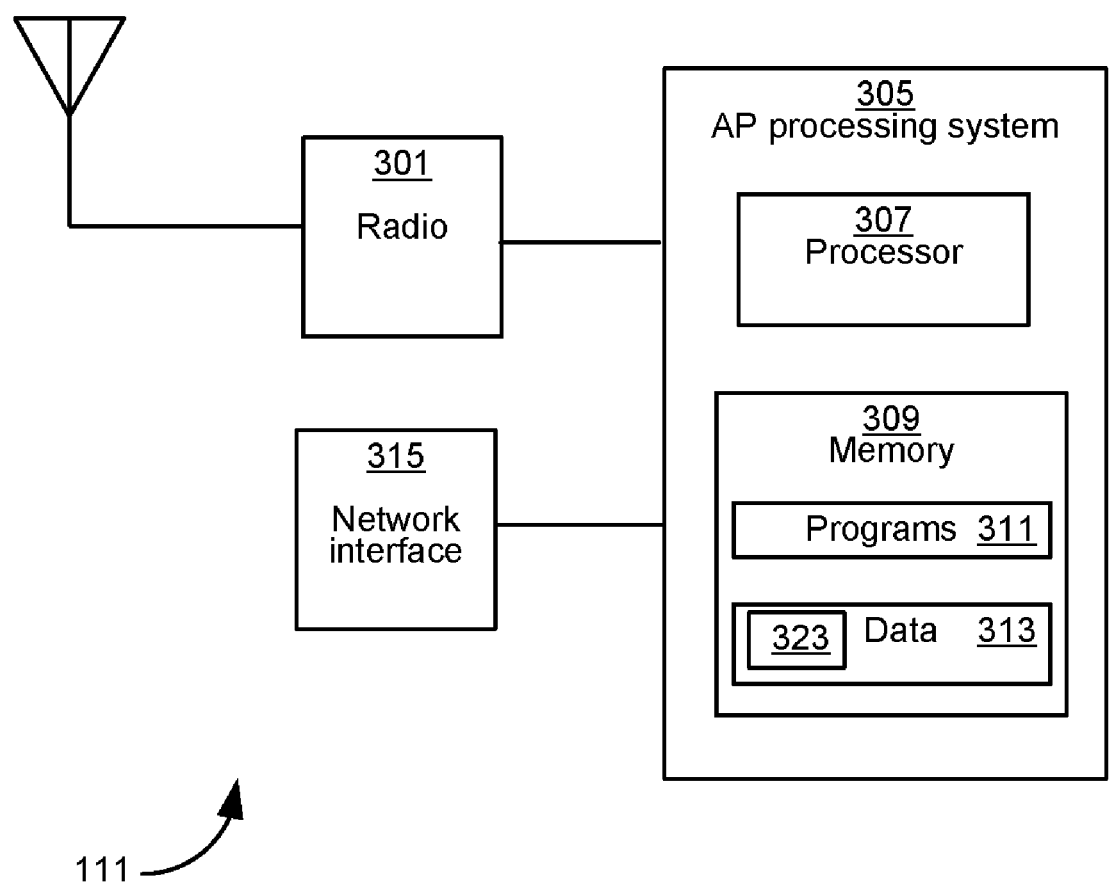
FIG. 3 shows a simplified block diagram of one embodiment of an access point that includes an embodiment of the present invention.

FIG. 3 shows a simplified block diagram of one embodiment of an AP that includes a radio 301 that is used for data communication with clients associated with the AP. One embodiment of the AP 111 includes a network interface 315 that enables the AP to be coupled to a wired network such as network 107. In one embodiment, the radio 301 and network interface 315 are coupled to an AP processing system 305 that includes a processor 307 and a memory subsystem 309. The memory subsystem includes programming instructions that, when executed by the processor, implement the AP processes described herein. The memory 309 also includes programs 311 and data 313 that includes the data structures such described herein used to implement one or more features of an embodiment of the present invention. Of course, those in the art will recognize that different architectures for APs are possible, including APs that have some special purpose hardware not shown in FIG. 3, and that include hardware and software. The invention is not limited to the architecture shown in FIG. 3.

One embodiment of the wireless network operates substantially in conformance to the IEEE 802.11 standard.

Multicasting in a Wireless Network

Those in the art will be familiar with multicasting. Clients typically subscribe to multicast streams using a subscription protocol. For example, Internet Group Management Protocol (IGMP) is now (2007) an integral part of the Internet Protocol (IP) and is used by IP hosts to register their dynamic multicast group membership. It is also used by connected routers to discover these groups. IGMP provides what is called IGMP snooping, multicast registration, and execution of other components of multicasting.

Figure 4:
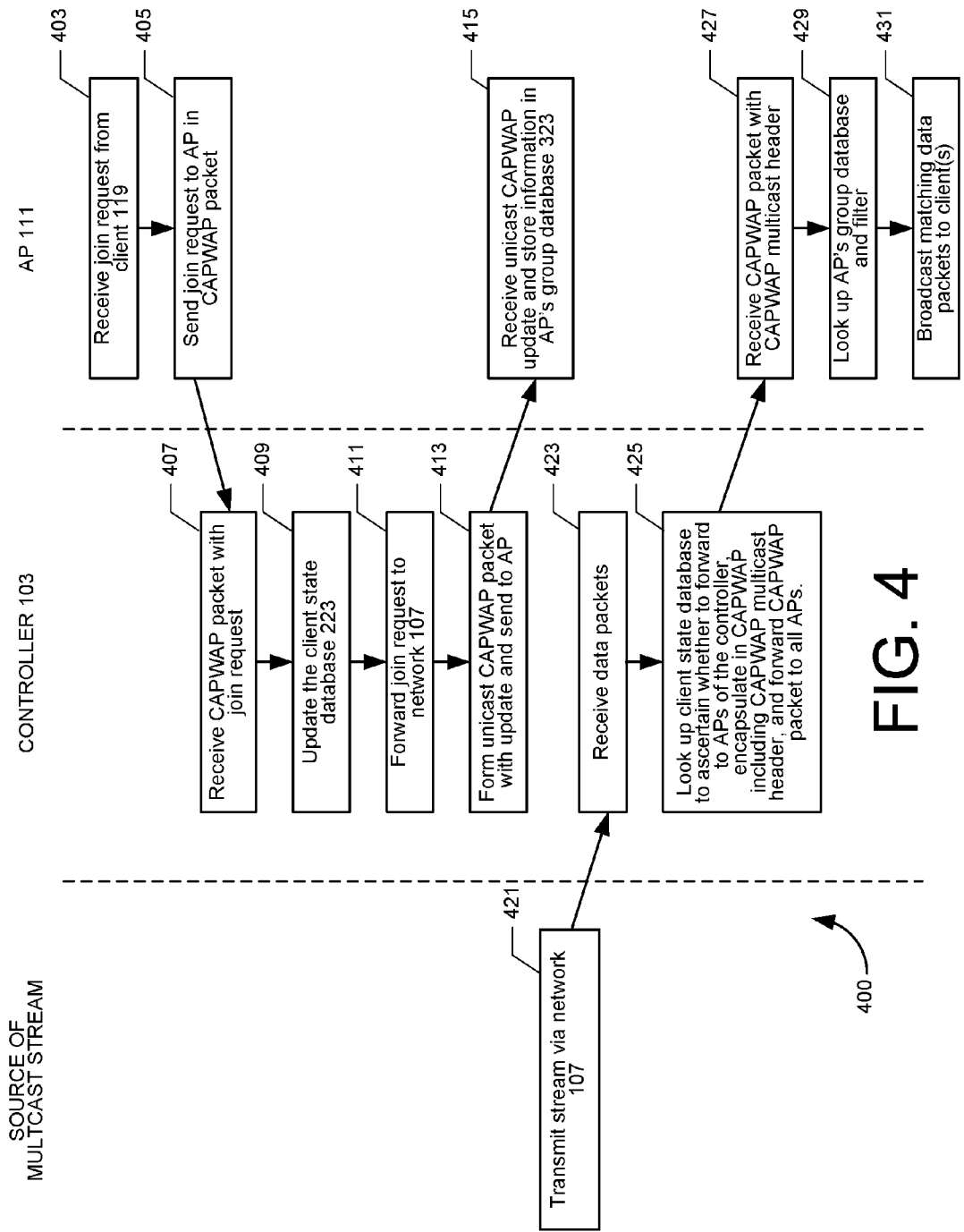
FIG. 4 shows a flowchart 400 of one method embodiment of the present invention operating at a controller and at an access point of the controller.

FIG. 4 shows a flowchart 400 of one method embodiment of the present invention that includes multicasting a stream that includes a plurality of data packets. The multicasting includes the source of the multicast stream, e.g., in the wired network at or coupled to network 107 in 421 sending the plurality of data packets. At least a portion of the data packets are packets having a predetermined identifier, as will be set forth in detail below. The remainder of the data packets are packets not having the predetermined identifier. In one embodiment, the packets of the stream are transmitted via the network 107 to a wireless access point, e.g., AP 111 for subsequent forwarding to the clients that are members of the multicast group.

In one embodiment, the controller of each AP, e.g., controller 103 of APs 111 and 115, and controllers 105 and 109 maintains a client state data structure 223, e.g., a database with a client state table 223 in the data part 213 of the memory 209 of the controller in the case of controller 103. The client state data structure 223 includes information about clients associated with that controller's AP(s), e.g., as a list of clients. For each client, information is included on a corresponding IGMP join with group information for that client. Thus, each controller knows which groups to forward to its APs because such APs' respective clients are members of one or another multicast group.

In one embodiment, the actual filtering of data packets to ascertain where or not to wirelessly broadcast the packets occurs at the APs. In one embodiment, each AP, e.g., AP 111 maintains a WLAN/Multicast group data structure 323 in the data part 313 of the memory 309, e.g., in the form of a WLAN/Multicast group database, e.g., a group table based on information received from its clients and/or information received from its controller. Such information includes which multicast groups to forward to clients.

After the sending 421, suppose the sending includes sending to a VLAN or an interface that is connected to a controller, e.g., controller 103. The method in 423 includes receiving the data packets controller and ascertaining in 425 if there is a match of a multicast group to an entry in the controller's client state data structure 223. In the case there is a match, the controller, e.g., controller 103 is operative in 425 to encapsulate and forward the multicast data packets to all its AP's, e.g., APs 111 and 113, using a CAPWAP multicast packet. The CAPWAP multicast packet includes a CAPWAP multicast header that contains the group information.

Suppose, as shown in 427, an access point, e.g., AP 111 receives this CAPWAP multicast packet. The AP 111 is operative to remove the CAPWAP multicast header and ascertain in 429 by looking up the AP's multicast group data structure 323 whether to forward the multicast packets. The multicast group data structure 323 includes multicast group update information that the AP 111 received from the controller 103. Thus the method includes selecting the data packets having predetermined identifiers according to the multicast group data structure 323. The selecting includes comparing the data packets information in the AP's WLAN/Multicast group data structure (323 in the case of AP 111). Any data packets not having a predetermined identifier included in the WLAN/Multicast group data structure are discarded so as to give priority to the identified throughput. It should be understood that, except insofar as specifically stipulated, the mechanism or means for selecting and the multicast group data structure 323 and any other functional implementation can be realized as software, firmware, hardware or any combination thereof, and can reside within the access point, e.g., AP 111, or other implementation, or be a separate component, all without departing from the invention.

The selected packets are forwarded in 431 to a recipient, which is a wireless client of the AP, e.g., client 119 of AP 111. Such forwarding includes broadcasting the matching data packets to the clients.

FIG. 4 also shows a process of a client joining a particular multicast group. To join a particular multicast group, a client transmits a join requests (IMPG join request). Such join requests may be snooped by one or more network elements—a process called IMPG snooping—in the network infrastructure that processes the message and causes the client to join the multicast group for that multicast stream. IGMP snooping is a Layer 2 process that provides for intelligent multicast forwarding decisions by examining the contents of each frame's Layer 3 IP header.

In one embodiment, a client, e.g., client 119 sends an IGMP join. The client's AP 111, as a result of the IGMP join being sent by the client 119, in 403 receives the IGMP join and encapsulates the IGMP join into a CAPWAP packet. The client's AP 111 in 405 sends the encapsulated IGMP join to the WLAN controller, e.g. controller 103.

In 407, the controller 103 receives the CAPWAP packet with the encapsulated IGMP join, and in 409, the controller 103 updates the client state data structure 223 in the data part 219 of memory 209 with client/Multicast group list.

In 411, the WLAN controller 103 as a result of the updating of the controller's client state data structure 223, forwards the IGMP join to the network 107. In 413 the controller forms a unicast CAPWAP AP update packet for sending to the AP 111 with an update, including the following data:

A field for the WLAN ID, in one embodiment a one-byte field (currently 1-8)

A Multicast Group field that has a variable length field and that follows the WLAN ID field. In one embodiment, the length of the Multicast Group field varies in four byte increments. The Multicast Group field defines the groups the AP is operative to forward. In one embodiment, the four byte field contains the last three octets that describe the multicast group.

The controller 103 in 423 further sends the unicast CAPWAP AP update packet to its APs, e.g., AP 111.

The AP 111 in 415 receives the unicast CAPWAP AP update packet with the update, and updates its WLAN/Multicast group data structure 323 with the update information.

Thus, each controller maintains client and multicast group information, each AP maintains a typically smaller table about WLAN identity and multicast groups that is updated by its controller. The controller does the initial snooping to avoid sending multicast traffic that has no recipients, the AP carries out additional filtering to avoid transmitting multicast traffic that has no recipients.

Roaming

Wireless networks provide mobility. Wireless networks that feature mobility of a multicast stream source and/or recipient(s) present challenges, given that the multicast delivery configuration needs to change if the source and/or the recipient (s) is/are physically moved and associate(s) with new elements in the wireless network.

The method thus is operative to limit which access-points and which WLAN's have a multicast packet turned into an 802.11 broadcast.

Figure 5:
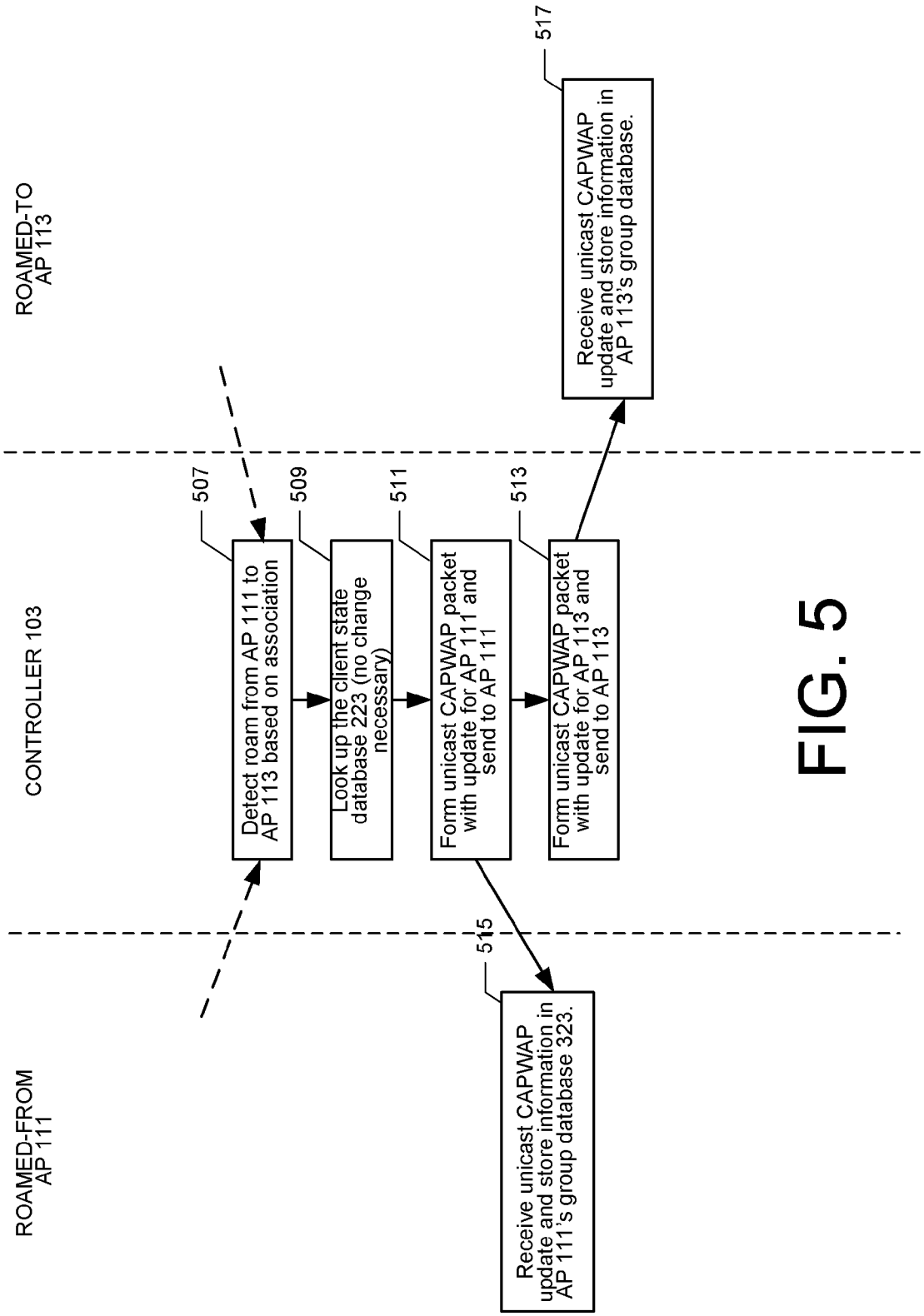
FIG. 5 shows a flowchart of one method embodiment of the present invention that operates at a controller, at a roamed-from access point, and at a roamed-to access point as a result of a roam of a client station.

FIG. 5 shows the flowchart of a first example scenario. Suppose a client such as client 119 roams from its AP 111 to another AP, e.g., AP 113 that has same controller 103. Because the controller is the same controller 103 for the original roamed-from AP 111 and the roamed-to AP 113, the roam would be detected by AP 111's controller 103 (shown in step 507) and, as a result, AP 111's controller 103 is operative in 509 to look up the client state database 223 and to form a unicast CAPWAP AP update packet to send to AP 111 (shown in step 511), and to send the update packet to the roamed-from AP 111. Also, AP 111's controller 103 is operative in 5131 to form a unicast CAPWAP AP update packet to send to AP 113, and to send the update packet to the roamed-to AP 113. As a result, in 515, the roamed-from AP 111 received its respective unicast CAPWAP AP update packet and updates its multicast group data structure 323, and in 517, the roamed-to AP 111 received its respective unicast CAPWAP AP update packet and updates its multicast group data structure. In this manner, each of APs 111 and 113 knows which multicast packets to broadcast to its clients.

Figure 6:
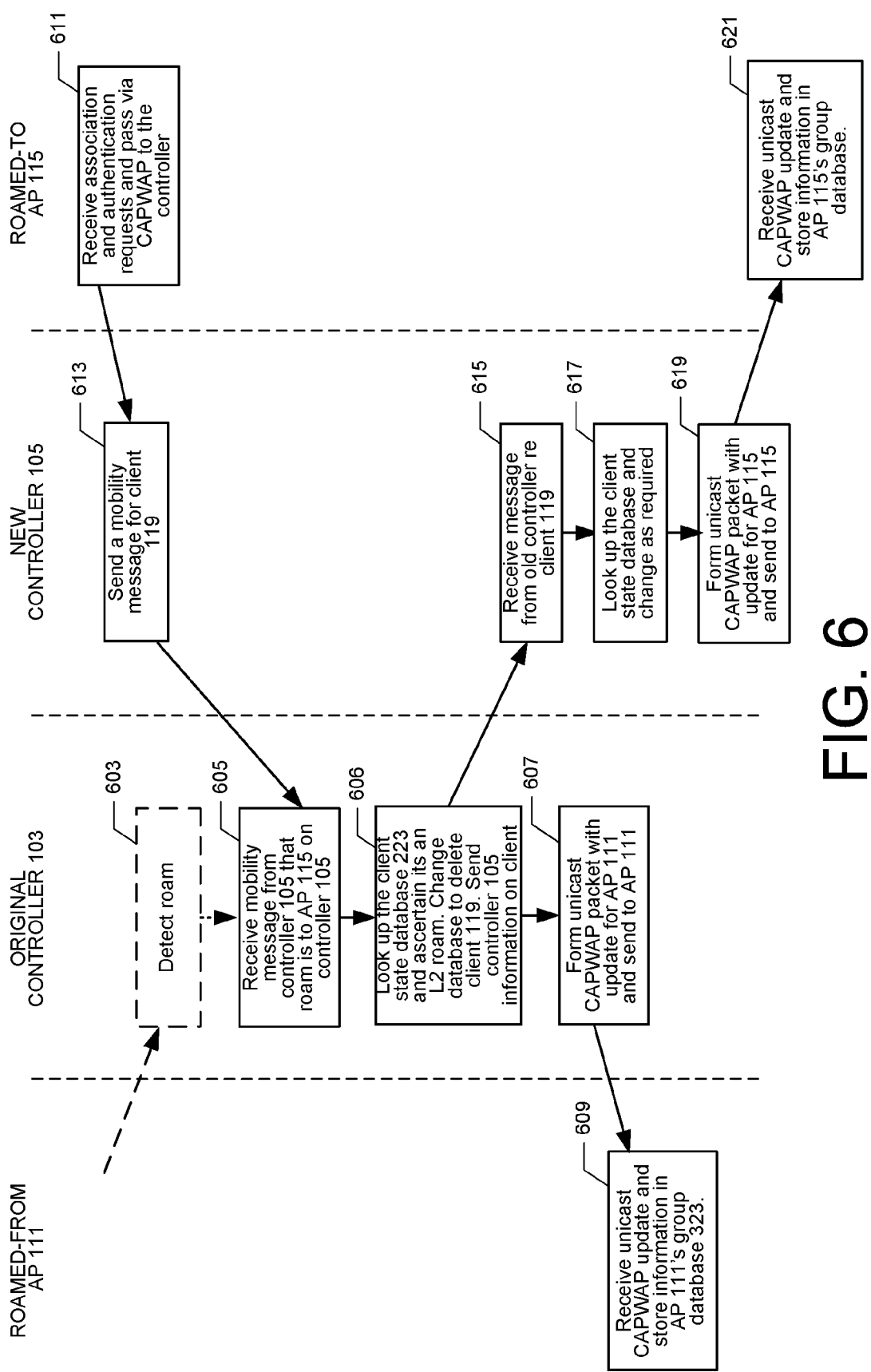
FIG. 6 shows a flowchart of another method embodiment of the present invention that operates at an original controller, at a roamed-from access point of the original controller, at a new controller, and at a roamed-to access point of the new controller a result of a roam of a client station.

FIG. 6 shows a flowchart of a method that applies to a second example scenario. Suppose a client such as client 119 roams from its AP 111 on one controller 103—the original controller—to a new access point, e.g., AP 115 on a different controller 105—the new controller. The new controller is on the same sub-network as the first controller. This is termed a "layer 2 roam" ("L2 roam"). In one embodiment, the original controller 103 is operative to detect in that the client 119 is no longer associated with the AP, for example, as shown in FIG. 6 as block 603, as a result of disassociation request information received from the roamed-from AP 111. Note that while in one embodiment, the detecting of the roam is by receiving information from the AP 111, this is not necessarily the only way the roam is detectable. As an example, the roam might occur because of a broken link between the AP 111 and its controller. In such a case and in other cases, the detection of the roam occurs (only or additionally) in step 605 as a result of receiving a mobility announcement from the new controller (see below). Thus the detection of the roam at the original controller 103 can occur either as a result of receiving information from the AP 111 or as a result of receiving a mobility message, or both.

The roaming client 119's association with the new AP 115 includes in 611 the AP 115 receiving an association request and an authentication request. The new AP 115 passes such requests to its controller 105. In 613, the new controller 105 sends out a mobility announcement to all controllers. The first controller in 605 receives the mobility announcement, and if there was no disassociation request received leading to step 603, thus detect that there has been a roam. The first controller in 605 is operative in 606 to ascertain that this is about its AP's (previous) client and that as the new controller is in the same sub-network, that this an L2 roam and that a change is be needed to the client state data structure 223. 606 includes the controller 103 sending information to the new controller 105 on the client 119 from its client state data structure 223 so that the new controller can appropriately deal with the client. The original controller 103 also is operative to appropriately modify its client state data structure 223 containing its client/multicast list. In this example, as a result of the disassociation of the client 119, the modifying includes removing the client 119 and its multicast group from the client/multicast list in the client state data structure 223. The controller 103 in 607 further is operative to form and send a unicast CAPWAP AP update packet to the roamed from access point 111. In 609, the roamed-from AP modifies its multicast group data structure 323.

The new controller 105 in 615 receives the information on client 119 from the original controller 103. The new controller 105 in 617 is operative to look up its client state data structure and to update its client/multicast group list in the client state data structure. The controller 105 further is operative in 619 to form and send a unicast CAPWAP access point update packet to the AP 115 with information, e.g., an update to its WLAN/Multicast group data structure to store in AP 115. AP 115 receives this information and in 621 modifies its multicast group data structure accordingly.

The method includes the new controller appropriately updating the multicast routers.

Another example for which a method similar to that of FIG. 6 is applicable, suppose an AP of the first controller 103, e.g., AP 111 or AP 113 has a new roaming client associate with it. Suppose the roam is to AP 111. As a result of the authentication of the roaming client, one embodiment includes the first controller 103 sending out a mobility announcement to all controllers. The first controller 103 receives information from the controller of the roamed-from AP of the roaming client with information on the client from that controller's client state data structure so that the first controller 103 can appropriately deal with the client and AP 111. The first controller 103 ascertains if a change to its client state data structure 223 is needed, and if so, changes the contents of its client state data structure 223 to account for the roaming client; and instructs the AP 111 to change its WLAN/Multicast group data structure 323 to account for the roaming client, e.g., by the controller 103 forming and sending a unicast CAPWAP access point update packet to the AP 111.

Figure 7:
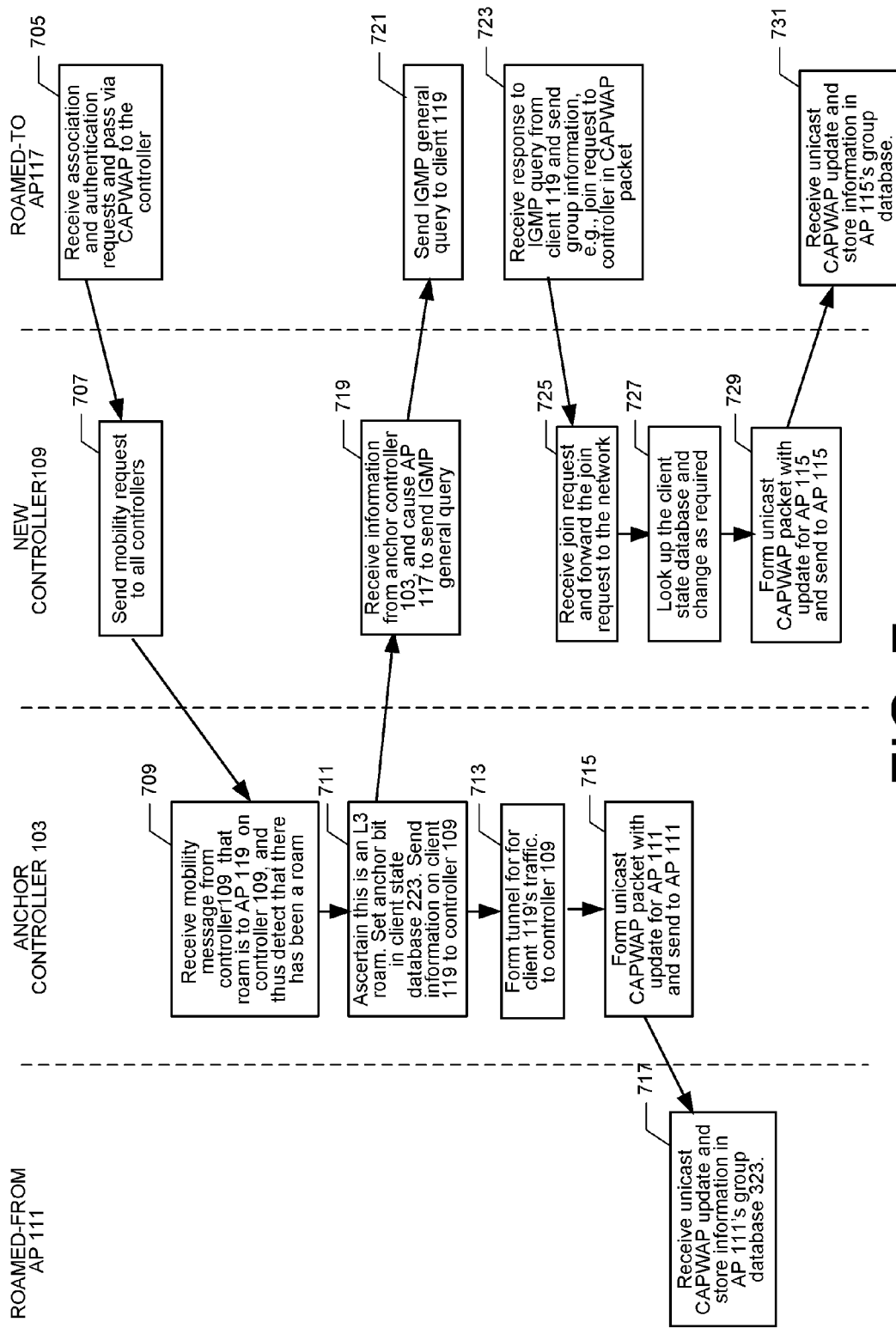
FIG. 7 shows a flowchart of yet another method embodiment of the present invention that operates at an original controller, at a roamed-from access point of the original controller, at a new controller in a different network, and at a roamed-to access point of the new controller a result of a roam of a client station.

In the above example scenario shown in FIG. 6, the two controllers 103 and 105 are in the same network. FIG. 7 illustrates by way of a simplified flow chart another example scenario. Suppose the client device 119 is a member of a wireless LAN that has a default VLAN. Suppose the client 119 roams from an access-point 111 on one controller 103, called the anchor controller in this case, to a new access point 117 on a different controller 109 on a different network 108, called a foreign network in this example scenario. This is termed a "layer 3 roam" (also called an "L3 roam"). A roaming client 119 has to maintain its IP address and cannot source Multicast traffic to the foreign network 108 or it will be dropped.

When the client 119 associates with the new AP 117, the AP 117 in 705 receives an association and an authentication request and is operative to pass these onto AP 117's new controller 109 via CAPWAP. In 707, the new controller 109 is operative to send out a mobility announcement to all controllers. In 709, the old controller 103 receives the mobility message. The first time the first controller 103 receives the mobility message as a result of the association of the roaming client, that is, upon ascertaining that this is a first roam, the controller 103 is operative in 711 to ascertains that the roam is an L3 roam to another network, and as a result to set an indication, e.g., one-bit in its entry for the client 119 in its client state data structure, called the anchor bit, to indicate that it is the anchor controller for this client. The anchor controller is operative in 711 to send information on the client 119 to the new controller 109 on the client and its sub-network so that the new controller can take appropriate action. In one embodiment, the method is operative such that all client unicast and multicast data packets are tunneled back to the anchor controller 103. The anchor controller is operative in 713 to form such a tunnel to the new controller 109. The anchor controller is operative then to forward such unicast and multicast data packets from the client to the network as usual (shown in step 715.) In one embodiment, the anchor controller 103 is operative, upon ascertaining that this is the first roam of the client, to maintain client/multicast group information on its client state data structure 223 but not to receive traffic or transmit traffic for this group if this roaming client 119 is the only member. The anchor controller 103 further is operative to form a unicast CAPWAP packet with an update for the roamed-from access point 111's client/multicast group data structure 323 to adjust for client 119's no longer being associated with the AP. The AP 111 receives this information in 717, and makes the required changes to its multicast group data structure 323. In addition, The controller 103 is further operative to send a leave to the upstream (foreign) network 108 if required.

At the foreign controller 119, in 719, the foreign controller receives the information from the controller 103 in response to its mobility message as a response to the client 119 associating with the AP 117 controlled by the foreign controller 109. In one embodiment, the response to the mobility message contains Multicast information. In another, not all mobility information is included. In one embodiment, the foreign controller 109 also is operative in 719 to cause AP 117 to send, in 721 a general IGMP query to the roaming client 119. As a result, the client 119 responds with an IGMP membership report that includes the multicast group or groups that that the client is a member of. The AP 117 receives the response in 723 to forward the group information (the IGMP membership report) to its controller 109. The controller 109 is operative in 725 to receive the group information, to send the group information to its upstream switch(es) and router(s) to allow multicast traffic, and to proxy to the wired network via the default VLAN for the wireless LAN that the roaming client 119 is a member of using its own IP address so as to make a forwarding update on the network. The new controller 109 in 727 also changes the contents of its client state data structure to account for the roaming client; and in 729 instructs the AP 117 to change its WLAN/Multicast group data structure to account for the roaming client, e.g., by the controller 109 forming and sending a unicast CAPWAP access point update packet to the AP 117. The AP 117 in 731 receives the unicast CAPWAP access point update packet and changes its multicast group data structure accordingly.

The process will be the same as it moves from access point to access point on the same controller. When this client roams to an access point that is on a third controller, the foreign controller will update the roamed from access points WLAN/Multicast group list and the above process repeats with a "new" foreign controller following the same path of packet processing. The anchor controller remains the anchor controller but, in this case, the anchor controller is operative to form a new tunnel to the third controller. The second controller 109 is operative to remove the roaming client 119 from its client state data structure and to cause its AP to modify its client/multicast group data structure.

Note that the roaming client 119 also can source multicast traffic. Such multicast traffic is tunneled from the controller 109 of the foreign network to the anchor controller 103. The anchor controller then multicasts the roaming client-sourced traffic.

Thus, group membership information is also updated in any associated bridges and switches in the path to any roaming client stations station.

Not described herein are details of the encryption that occurs on such a network for multicast traffic. U.S. Patent Application Publication No. 20050025160, incorporated herein by reference, describes such encryption, but not for the case of lightweight APs. Modifying the description for lightweight APs with controllers would be straightforward to one of ordinary skill in the art.

It should be appreciated that although the invention has been described in the context of the IEEE 802.11 standard, the invention is not limited to such contexts and may be utilized in various other wireless network applications and systems, for example, wireless networks conforming to other standards and for other applications, including, for example other WLAN standards and other wireless standards. Applications that can be accommodated include IEEE 802.11 wireless LANs and links, wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

In keeping with common industry terminology, the terms "base station", "access point", and "AP" may be used interchangeably herein to describe an electronic device that may communicate wirelessly and substantially simultaneously with multiple other electronic devices, while the terms "client," "mobile device" and "STA" may be used interchangeably to describe any of those multiple other electronic devices, which may have the capability to be moved and still communicate, though movement is not a requirement. However, the scope of the invention is not limited to devices that are labelled with those terms.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) logic, e.g., instructions encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are executable on one or more processors, e.g., one or more processors that are part of a controller for some features, or a wireless station acting as an access point for other features. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries logic including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

References throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be clear to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:
at a first controller controlling and having one or more secure links to one or more respective access points of a wireless network:
receiving a plurality of data packets including at least one predetermined identifier operative to identify one or more multicast groups, the first controller controlling access point functionality of the first controller's respective access points;
maintaining a controller-maintained client state data structure including an entry for any client of any access point controlled by the first controller, the entry for a client including multicast group information for the client;
selecting the data packets of the received data packets that match information in the client state data structure; and
forwarding the controller-selected data packets to one or more of the access points controlled by the first controller,
such that a first access point controlled by the first controller and maintaining a multicast group data structure of one or more multicast groups that any client or clients associated with the first access point are members of, as a result of receiving the controller-selected packets forwarded by the first controller, is operative to:
look up the first access point's multicast group data structure,
select the data packets of the controller-selected received packets that match information in the multicast group data structure, and
wirelessly transmits the access-point-selected packets,
wherein the controlling of the access point functionality of an access point by the access point's controller uses commands conforming to a protocol and sent to the respective access point via the secure link to the access point.

2. A method as recited in claim 1, wherein the wireless network is a network conforming to the IEEE 802.11 standard, and the protocol is Control And Provisioning of Wireless Access Points (CAPWAP) or Light Weight Access Point Protocol (LWAPP).

3. A method as recited in claim 1, further comprising:
   detecting that a first client of the first access point has roamed;
   in the case that the roam is to a second access point controlled by the first controller, instructing the second access point to change its multicast group data structure;
   in the case the roam is to a second access point controlled by a second controller, the first controller receiving a mobility message from the second controller regarding the first client and sending information on the first client to the second controller;
   ascertaining if a change to the first controller's client state data structure is needed and, if the change is needed, changing the contents of the first controller's client state data structure; and
   instructing the first access point to change the first access point's multicast group data structure.

4. A method as recited in claim 3, wherein the first controller detecting is as a result of receiving information from the first access point.

5. A method as recited in claim 3, wherein the first controller detecting is as a result of the first controller receiving the mobility message.

6. A method as recited in claim 3, wherein in the case the roam is to a second access point controlled by a second controller, and in the case the second controller is ascertained to be in the same network as the first controller, the changing of the contents of the client state data structure includes deleting the entry for the first client.

7. A method as recited in claim 3,
   wherein in the case the roam is to a second access point controlled by a second controller, in the case the second controller is ascertained not to be in the same network as the first controller, and in the case the roam is ascertained to be the first roam of the first client,
      the changing of the contents of the client state data structure includes adding an indication to the entry for the first client that the controller is the anchor controller for the first client, and
      the method further comprises forming a tunnel between the first and second controller,
      such that the second controller can receive multicast group information on the first client that is roaming from the first controller, ascertain if a change to the second controller's client state data structure is needed, and if so, change the contents of its client state data structure to account for the roaming first client; and send group membership information to upstream to a network of the second controller.

8. A method as recited in claim 7, wherein receiving of multicast group information on the roaming first client by the second controller from the first controller is as a result of the second controller instructing the second access point to issue a query to the roaming first client to provide the roaming first client's multicast group information; as a result of the roaming first client responding to the query, and as a result of the second controller receiving from the second access point group membership information.

9. A method as recited in claim 8, wherein the query and the responding to the query conform to an Internet Group Management Protocol (IGPM) query and a response to an IGMP query, respectively.

10. A system comprising:
    a first controller in a wireless network operative to control one or more wireless access points, the first controller including a memory subsystem operative to store a client state data structure including an entry for client or clients of the one or more wireless access point controlled by the first controller, an entry for a client including multicast group information for the client; and
    a first wireless access point having a secure link with the first controller, and whose access point functionality is controlled by the first controller using commands conforming to a protocol and sent via the secure link, the first wireless access point including a memory subsystem operative to store a multicast group data structure of one or more multicast groups that any client or clients associated with the first wireless access point are members of,
    such that the first controller receiving data packets including at least one predetermined identifier operative to identify one or more multicast groups, is operative to select the data packets of the received data packets that match information in the client state data structure for clients of the first access point and forward the controller-selected data packets to the access point, and
    such that the first wireless access point as a result of receiving the controller-selected packets forwarded by the first controller, is operative to:
       look up the first access point's its multicast group data structure,
       select the data packets of the controller-selected packets that match information in the multicast group data structure, and
       wirelessly transmits the access-point-selected packets.

11. A system as recited in claim 10, wherein the wireless network is a network conforming to the IEEE 802.11 standard, and the protocol is Control And Provisioning of Wireless Access Points (CAPWAP) or Light Weight Access Point Protocol (LWAPP).

12. A system as recited in claim 10,
    wherein, as a result of a first client of the first access point roaming, the first controller is operative to:
       detect that a first client of the first access point has roamed,
       in the case that the roam is to a second access point controlled by the first controller, instruct the second access point to change the second access point's multicast group data structure;
       in the case the roam is to a second access point controlled by a second controller,
          receive a mobility message from the second controller regarding the first client, and
          send information on the first client to the second controller;
       ascertain if a change to its the first controller's client state data structure is needed and, if the change is needed, change contents of the first controller's client state data structure; and
       instruct the first access point to change the first access point's multicast group data structure, and
    wherein, the first access point is operative to:
       as a result receiving instruction from the first controller to change the first access point's multicast group data structure, change the first access point's multicast group data structure.

13. A system as recited in claim 12,
    wherein in the case the roam is to a second access point controlled by a second controller, and in the case the second controller is ascertained to be in the same network as the first controller, the changing of contents of the client state data structure of the first controller includes deleting the entry for the first client.

14. A system as recited in claim 12, wherein in the case the roam is to a second access point controlled by a second controller, in the case the second controller is ascertained not to be in the same network as the first controller, and in the case the roam is ascertained to be the first roam of the first client, the changing the of contents of the client state data structure by the first controller includes adding an indication to the entry for the first client that the controller is the anchor controller for the first client, the first controller further operative to form a tunnel between the first and second controller, such that the second controller can receive multicast group information on the roaming first client, ascertain if a change to the second controller's client state data structure is needed and, if so, change contents of its client state data structure to account for the roaming first client; and send group membership information upstream to the second controller's network.

15. A controller comprising:
one or more network interfaces operative to couple a controller to a network and further operative to couple the controller to a first wireless access point of a wireless network, the coupling between the controller and the first wireless access point including a secure link over which commands are sendable that conform to a protocol and that are to control access point functionality of the first wireless access point, the first wireless access point including a memory subsystem operative to store a multicast group data structure of one or more multicast groups that any client or clients associated with the first wireless access point are members of,
a memory subsystem operative to store a client state data structure including an entry for client or clients of the access point or points controlled by the controller;
an entry for a client including multicast group information for the client; and
logic configured such that as a result of the controller receiving a plurality of data packets including at least one predetermined identifier operative to identify one or more multicast groups, the controller is operative to select the data packets of the received data packets that match information in the client state data structure for clients of the first wireless access point and forward the controller-selected data packets to the access point,
such that the first wireless access point as a result of receiving the controller-selected packets forwarded by the controller, is operative to:
look up the first wireless access point's multicast group data structure,
select the data packets of the received controller-selected packets that match information in the multicast group data structure, and
wirelessly transmits the access-point-selected packets.

16. A controller as recited in claim 15, wherein the wireless network is a network conforming to the IEEE 802.11 standard, and the protocol is Control And Provisioning of Wireless Access Points (CAPWAP) or Light Weight Access Point Protocol (LWAPP).

17. A controller as recited in claim 15, wherein the logic includes logic encoded in one or more tangible media that is executable by one or more processors of a processing system included in the controller.

18. A controller as recited in claim 15, wherein the logic is further configured such that as a result of a first client of the first access point roaming, the controller is operative to:
detect that a first client of the first access point has roamed,
in the case that the roam is to a second access point controlled by the controller, instruct the second access point to change the second access point's multicast group data structure;
in the case the roam is to a second access point controlled by a different controller,
receive a mobility message from the different controller regarding the first client, and
send information on the first client to the different controller;
ascertain if a change to the controller's client state data structure is needed and, if the change is needed, change contents of the controller's client state data structure; and
instruct the first access point to change the second wireless access point's multicast group data structure, and
wherein, the first access point is operative to:
as a result receiving instruction from the controller to change the first access point's multicast group data structure, change the first access point's multicast group data structure.

19. A controller as recited in claim 18, wherein in the case the roam is to a second access point controlled by a different controller, and in the case the different controller is ascertained to be in the same network as the controller, the changing of contents of the client state data structure of the controller includes deleting the entry for the first client.

20. A controller as recited in claim 18, wherein in the case the roam is to a second access point controlled by a different controller, in the case the different controller is ascertained not to be in the same network as the controller, and in the case the roam is ascertained to be the first roam of the first client, the changing the of contents of the client state data structure by the controller includes adding an indication to the entry for the first client that the controller is the anchor controller for the first client, the controller further operative to form a tunnel between the first and different controller,
such that the different controller can receive multicast group information on the roaming first client, ascertain if a change to the different controller's client state data structure is needed, if so, change contents of the different controller's client state data structure to account for the roaming first client; and send group membership information to upstream to the different controller's network.

* * * * *

UNITED STATES PATENT AND TRADEMARK OFFICE
CERTIFICATE OF CORRECTION

PATENT NO. : 7,873,020 B2
APPLICATION NO. : 11/865512
DATED : January 18, 2011
INVENTOR(S) : Hunt et al.

It is certified that error appears in the above-identified patent and that said Letters Patent is hereby corrected as shown below:

In Column 16, line 28, after "the first access point's", kindly delete "its".

In Column 16, line 53, after "ascertain if a change to", kindly delete "its".

Signed and Sealed this
Fifteenth Day of March, 2011

David J. Kappos
*Director of the United States Patent and Trademark Office*